United States Patent [19]

Belanger et al.

[11] Patent Number: 4,541,106

[45] Date of Patent: Sep. 10, 1985

[54] DUAL ENERGY RAPID SWITCHING IMAGING SYSTEM

[75] Inventors: Barry F. Belanger, Milwaukee; Lawrence E. Sieb, Oconomowoc, both of Wis.

[73] Assignee: General Electric Company, Schenectady, N.Y.

[21] Appl. No.: 582,558

[22] Filed: Feb. 22, 1984

[51] Int. Cl.[3] .......... H04N 5/32

[52] U.S. Cl. .......... 378/099; 358/111

[58] Field of Search .......... 378/92, 99, 112, 100, 378/97, 118; 358/111; 364/414

[56] References Cited

U.S. PATENT DOCUMENTS

| | | | |
|---|---|---|---|
| 3,838,285 | 9/1974 | Siedband et al. | 378/118 |
| 3,961,173 | 6/1976 | Perry et al. | 378/118 |
| 4,204,225 | 5/1980 | Mistretta | 378/99 |
| 4,481,654 | 11/1984 | Daniels | 378/99 |
| 4,482,918 | 11/1984 | Keyes et al. | 378/99 |
| 4,499,493 | 2/1985 | Nishimura | 358/111 |

*Primary Examiner*—Alfred E. Smith
*Assistant Examiner*—T. N. Grigsby
*Attorney, Agent, or Firm*—Fuller, House & Hohenfeldt

[57] ABSTRACT

For hybrid digital subtraction angiography mask x-ray images are made at low and high x-ray tube anode kVp. Both exposures are terminated by AEC and the exposure times are calculated and stored and used to govern the times of a subsequent run sequence of alternate low and high energy pre-contrast and post-contrast exposure images. The data for the mask and subsequent images are stored individually on magnetic disk. A TV camera receives optical versions of the images. Its target is scanned or read out during a TV frame time between the end of a low energy exposure and the start of a high energy exposure. After the low energy mask exposure time is determined an anticipation or delay time is calculated and the low energy exposures in the run sequence are shifted from the vertical blank pulse preceding the frame in which the exposure starts by the delay time so all low energy exposures terminate coincident with the blanking pulse that precedes the read out frame. Since the high energy exposures are started at the end of the readout, minimum time between low and high exposures is achieved. High kVp is fixed. Low kVp and tube MA are selectable. High MA that the tube target can withstand thermally is calculated and adjusted so it will not result in excessive tube target bulk or focal spot temperature.

4 Claims, 4 Drawing Figures

DUAL ENERGY RAPID SWITCHING IMAGING SYSTEM

BACKGROUND OF THE INVENTION

This invention relates to diagnostic x-ray apparatus and, particularly, to a system that is capable of performing hybrid digital subtraction angiography procedures.

Hybrid digital subtraction angiography is described in detail in U.S. patent application Ser. No. 371,683, filed Apr. 26, 1982, now U.S. Pat. No. 4,482,918 . This patent is assigned to the assignee of the present application. The object of digital subtraction angiography is to produce a visible image of a blood vessel whose lumen is occupied by an x-ray opaque medium in which image soft tissue and boney structures which might otherwise obscure the vessel are cancelled out. In hybrid digital subtraction angiography x-ray images of the anatomy of interest are made by exposing the patient to x-ray beams having different average energy levels, that is, having two different narrow-x-ray spectral bands. The so-called low energy exposures are made with comparatively low peak kilovoltage (kVp), such as 60 to 90 kVp, applied to the x-ray tube anode. The so-called high energy exposures are made with, typically, 130 to 140 kVp applied to the x-ray tube anode. The x-ray tube current or milliamperage (MA) is higher for the low energy exposures than for the high energy exposures. The duration of the low energy exposures may be longer or shorter than the duration of the high energy exposures, depending on the density of the anatomical region being examined, but usually the low energy exposures have the longer duration. In the hybrid subtraction mode used to illustrate the invention herein, the patient is arranged between an x-ray tube and an x-ray image intensifier whose optical output image is viewed by a television (TV) camera. The x-ray tube power supply is adapted to switch the kVp applied to the x-ray tube anode between low and high levels very rapidly. During low energy exposures an x-ray filter is inserted in the beam to filter out or attenuate radiation having energy below the low energy spectral band and during the high energy exposures a different filter is inserted in the beam to filter out or attenuate radiation having energy below that of the high energy spectral band. In the exemplary hybrid subtraction mode, a low energy mask image is obtained prior to the time that the x-ray contrast medium which has been injected somewhere in the blood vessel of the patient reaches the blood vessel of interest. The digitized picture element (pixel) data representative of the low energy mask image are stored on magnetic disk. As soon as the low energy mask image is acquired the high energy mask image is made and its pixel data are stored. The mask images are made during what is called the precontrast time. It is desirable that the two mask images be made as close together as possible so that there will be no adverse effect produced by voluntary or involuntary movement of the patient's anatomy between the x-ray exposures. After the mask images are obtained, closely successive low and high energy exposure pairs are made through the pre-contrast time and through the post-contrast time during which the contrast medium is flowing through the blood vessel of interest. The raw digital pixel data representative of these images are stored on magnetic disk. In a subsequent reprocessing procedure, the data are accessed and the low and high energy mask images are subtracted from the subsequent low and high energy images, respectively, and the resulting sequence of low and high energy difference images data are stored. Subtraction causes anything that remains constant throughout the sequence of images to be cancelled and lets data representative of the contrast medium and anything that changes remain. The low energy difference images data and the high energy difference images data are then summed to produce two sets of data one of which represents the sum of the low energy images and the other of which represents the sum of the high energy images. The low energy image data set is then multiplied by a weighting factor and the high energy image data set is multiplied by another weighting factor. These factors are chosen so that when the sets of multiplied data are subtracted, data representative of motion of a specific material are substantially cancelled. After weighting the two data sets, one is subtracted from the other and the resulting set of data represents the image of the contrast medium in the blood vessel.

The apparatus described herein can be used to perform procedures other than hybrid digital subtraction angiography. For example it can perform ordinary temporal subtraction and energy subtraction procedures which require no further description for those skilled in the digital fluorography art.

Several problems that are connected with performing hybrid subtraction angiography have not been solved satisfactorily heretofore. The first problem is to maximize spectral-energy separation. The second problem is to minimize the total x-ray exposure time to prevent patient motion from interfering with the cancellation process. A third problem is to prevent damage to the x-ray tube which will occur if the energy input to the tube is too great during an exposure sequence.

There are two thermal factors that must be considered in rotating anode x-ray tubes. Typically, the temperature of the bulk of the x-ray tube target or rotating anode should not be allowed to exceed about 1100° C. or else the target may warp or conduct so much heat to the anode bearing that they will be damaged. Another factor to be considered is that when the electron beam current exceeds a certain value while the high kVp is applied to the anode of the x-ray tube there may be melting of the target where the beam is focused on it which means that there must be assurance that the temperature at the focal spot will not exceed about 3000° C. for rhenium alloy coated tungsten targets which are most commonly used in high capacity rotary anode x-ray tubes at the present time.

In prior art digital subtraction angiography systems a single x-ray exposure was made, usually a low energy exposure, that is, an exposure using low kVp on the x-ray tube anode and relatively high x-ray tube MA. An automatic exposure control (AEC) was used to terminate the exposure when the desired x-ray dosage was accumulated. Means were provided for measuring the automatically terminated exposure time interval and this time was stored and used to govern the length of all subsequent high and low energy exposure intervals. One of the problems with using the same exposure time for the low and high energy exposures is that sometimes the optical version of the x-ray image is too bright for the TV camera and at other times it is not bright enough. The former way around this problem was to have the user make several trial exposures and adjust the exposure time until the proper light level to the TV camera was obtained. Unfortunately, while exposure time is being optimized the thermal load on the x-ray tube target may be increased, resulting in damage to the target.

Minimizing the time between high and low energy exposures is important. In conventional practice, each low energy x-ray exposure and each high energy x-ray exposure is initiated in synchronism with the TV camera vertical blanking pulses and the camera target is not read out until the first blanking pulse occurs following the TV frame in which the exposure ends. There is no target readout during the x-ray exposure. A low energy exposure, for example, would start with a vertical blanking pulse and might end within a single TV frame time or it might extend over several frame times and terminate somewhere within a frame time. Readout of the TV camera pickup tube is blanked during the x-ray exposure so the image is fully formed before the TV tube beam is allowed to scan the camera tube target. When the exposure ends within a particular TV frame there is a delay until the next vertical blanking pulse occurs to initiate the next frame time during which the TV pickup tube target is read out to produce the analog video signals representative of the image. The ensuing high energy exposure is started concurrently with the first vertical blanking pulse that was coincident with the end of the TV target readout frame. The delay between the end of the low energy exposure and the next ensuing blanking pulse that started readout did not represent the minimum time that could be obtained between the end of the low energy exposure and the beginning of the high energy exposure.

SUMMARY OF THE INVENTION

One objective of the invention is to provide independent exposure time control for the low and high kVp exposure, that is, low and high energy x-ray exposures to optimize x-ray photon statistics for producing energy-combination, or as otherwise called, hybrid subtraction images.

Another object of the invention is to calculate and use what is called anticipation time that allows for minimizing the time lapse between the low and high kVp exposures in the sequence or run following making of the mask images, thereby maximizing the probability that the low and high energy exposures will result in a useful hybrid image.

Another objective is to calibrate the x-ray tube control for making the high kVp or high energy exposures in a manner that optimizes x-ray tube thermal loading and minimizes exposure times.

How the foregoing and other objects of the invention are achieved will be evident in the ensuing more detailed description of a preferred embodiment of the invention which will now be set forth in reference to the drawings.

DESCRIPTION OF A PREFERRED EMBODIMENT

Figures 1, 4:
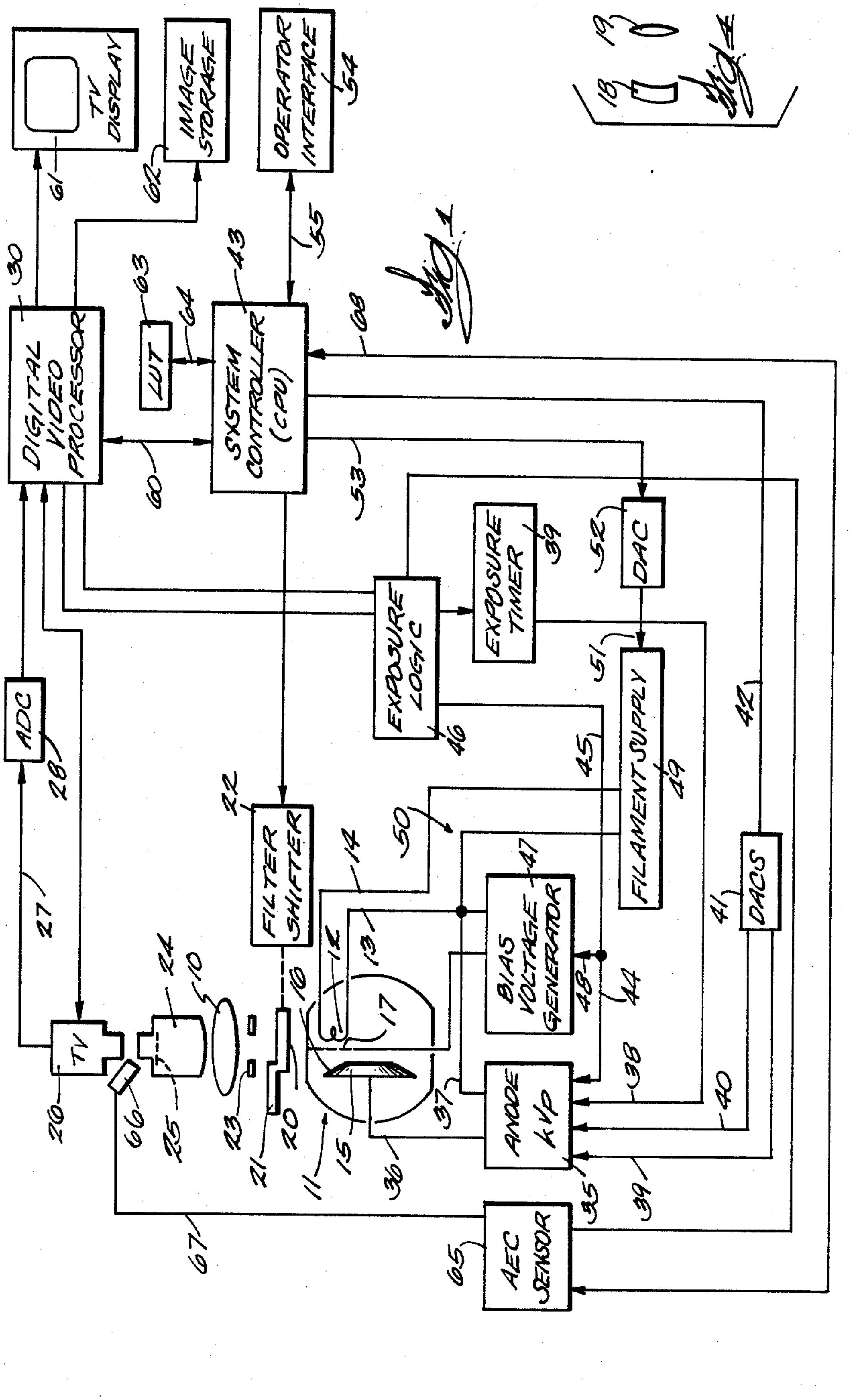
FIG. 1 is a block diagram of an x-ray system adapted for performing hybrid digital subtraction angiography procedures.
FIG. 4 shows how the configuration of the x-ray tube target focal spot may differ as between making a low energy exposure and a high energy exposure.

In FIG. 1 a patient undergoing a digital subtraction angiography examination is represented by the ellipse marked 10. There is a rotary anode x-ray tube 11 located beneath the patient. The x-ray tube includes an electron emissive cathode or filament 12 whose temperature and, hence, emissivity, is governed by the alternating current voltage that is supplied to it by way of lines 13 and 14. The x-ray tube has a rotating target 15 with a beveled face 16 on which the electron beam from filament 12 is focused to produce an x-ray beam emanating from a focal spot on the target. The tube also has a control grid 17. As indicated earlier, low energy x-ray exposures are characterized by having low kVp, such as 60 to 90 kVp applied to the x-ray tube anode target 15 while a comparatively high electron current or x-ray tube MA is flowing between the anode and cathodic filament. Thus, in this embodiment, during low energy exposures control grid 17 is held at 0 bias voltage relative to the cathode and tube MA is limited by the current flowing through filament 12 and, hence, by its temperature.

High energy exposures are characterized by applying the higher kVp, such as about 130 to 140 kVp, to the anode 15 and reducing the x-ray tube MA as compared with low energy exposures. The x-ray tube MA is determined by a negative bias voltage that is applied to grid 17 relative to the cathode during each short high energy x-ray exposure.

Since filament temperature is held constant during an exposure sequence, if negative bias were not applied when the tube anode is switched to high kVp, the x-ray tube current would increase substantially during high energy exposures. There is not enough time between low and high energy exposures to drop filament current for the high energy exposures because of the thermal lag of the filament. At this juncture it may be noted that during low energy exposures the focal spot on the x-ray tube target surface 16 will have a predetermined size and shape such as is approximated by the focal spot marked 18 in FIG. 4. Since the target surface 16 is beveled, the focal spot would appear to be narrower and sharper when viewed along a center line passing through the patient 10. However, for high energy exposures during which a negative bias voltage is applied to grid 17, x-ray tube MA is reduced although a higher voltage such as 130 to 140 kVp is applied to anode 15. A side effect of applying a negative bias voltage to the grid 17 is that it also focuses or concentrates the electron beam so the focal spot will take on the appearance of spot 19 in FIG. 4. With the higher kVp applied to the tube target 15 and the greater concentration of current in the focal spot 19 it is possible that the temperature the surface of the anode target can withstand may be exceeded. For instance, undesirable melting of the target focal spot track is likely to occur if the concentration of energy in focal spot 19 results in a temperature of about 3000° C. being developed in the focal spot. The manner in which a potentially excessive focal spot energy may be predicted and avoided, in accordance with one feature of the invention, will be discussed in greater detail later.

It may also be noted at this time that the temperature of the target body 15 for typical refractory metal targets must be limited to about b 1100° C. in order to avoid target warpage, excessive rotary anode bearing temperatures and possible fracture of the target. It should be evident that the temperature of the bulk of the x-ray tube target 15 will depend on the tube MA that is flowing and the duration of the exposure pulses in any given exposure sequence. If the low energy exposures are carried out with relatively high tube MA at relatively long durations, the bulk or body of the target will tend toward reaching its maximum permissible temperature. As the bulk temperature of the target increaes it is more vulnerable to damage by the more concentrated and energetic focal spot 19 that occurs during the high energy exposures so, in accordance with the invention, the high energy exposures are derated. How this is done will be discussed in more detail later.

In reference to FIG. 1, an x-ray filter plate is disposed in the x-ray beam where it emerges from the x-ray tube. The filter is shown symbolically as two sheets of different filter materials 20 and 21. Filter 20 is shown presently in the x-ray beam path as it is during low energy exposures during which the anode kilovoltage is in the range of 60 to 90 kVp while the MA is in the range of 200 to 1250 MA, typically. A high speed filter shifter is symbolized by the block marked 22. More details on the filter shifter are set forth in the copending U.S. application of Kump, et al., Ser. No. 494,974, filed May 16, 1983. The copending application is assigned to the assignee of the present application. For the present time it is sufficient to note that the filter shifter has the capability of exchanging the position of filter plates 20 and 21 within a television frame time which may be 33 or 40 milliseconds depending on whether power line voltage is 60 Hz or 50 Hz.

A collimator comprised of cooperating plates 23 is interposed in the x-ray beam to define the field size for reasons which are well known to those skilled in the art.

The differentially attenuated x-ray beam that emerges from the body 10 is input to an x-ray image receptor which in this case is an electronic image intensifier 24. As is well known, the x-ray image received in the intensifier is converted to an electron image and finally to a corresponding bright optical image which appears on a phosphor represented by the dashed line 25. The alternate low and high energy images appearing on the phosphor are viewed by a TV camera marked 26. The analog video signals that result from scanning the target of the TV camera pickup tube after an exposure is terminated are transmitted by way of a cable 27 to the input of an analog-to-digital converter (ADC) represented by the block marked 28. ADC 28 converts the analog video signals to corresponding digital signals having values depending on the intensity of the image picture elements (pixels). The pixels that compose low and high energy image frames are conducted by way of a bus 29 to a digital video processor represented by the block marked 30 where the signals are variously processed as will be discussed later.

The x-ray tube power supply will now be briefly outlined. One block of the power supply is labeled anode kVp and is marked 35. Kilovoltage is applied to the positive anode 15 of the x-ray tube in respect to the filament 12 by way of output lines 35 and 37 from the high kVp supply. A suitable anode kVp source is described in substantial detail in the copending application of Grajewski, Ser. No. 550,825, filed Nov. 14, 1983. The copending application is assigned to the assignee of the present application. Although the components of the high voltage supply 35 are not shown in detail herein, the supply, as in the cited copending application, comprises two three-phase autotransformers that are supplied from the building power lines. The autotransformers are adjusted independently by servomotors so they will yield output voltages corresponding to the low kVp and high kVp that will be applied to the x-ray tube anode target during the sequence of rapidly successive dual energy exposure pairs that are contemplated. The output lines from the autotransformers are connected through separate solid-state switches which connect to the three input terminals of a Y-connected primary of a step-up transformer. The neutral ends of the Y-connected primary windings are input to a solid-state primary switch. The solid-state switches that connect the autotransformers to the Y-connected primary of the step-up transformer are switched alternately so that low and high energy exposures may be made alternately. Each exposure is initiated by closing the primary switch so as to permit energization of the Y-connected primary of the step-up transformer and this results in a high kilovoltage being developed in the secondary of the step-up transformer. The high kilovoltage is rectified and applied between anode 15 and filament 12 by way of lines 36 and 37 in FIG. 1 as has been explained. Cable 38 in FIG. 1 supplies the signals for operating the primary switch to start and stop exposures and this line feeds out of an exposure timer that is represented by the block marked 39. Another pair of input lines 40 are output from a pair of digital-to-analog converters (DACs) represented by the single block marked 41. These converters have an input bus 42 for receiving digital signals from a system controller or central processing unit (CPU) 43 which signals control the setting of the autotransformers in the power supply. Output lines 40 from DACs 41 carry analog signals which are used to control the servomotors, not shown, that adjust the autotransformer voltage selector switches.

Another line 44 is input to power supply 35. Line 44 is connected to line 45 that feeds out of an exposure logic circuitry module 46. When the signal on line 44 goes to a logic high level, the three-phase switch in the power supply 35 that connects the low voltage autotransformer to the primary of the step-up transformer becomes conductive until a low energy exposure is terminated. When the signal on line 44 is switched to a low logic level, the other solid-state switch that connects the autotransformer for high voltage becomes conductive for energizing the primary of the step-up transformer.

A grid bias voltage generator is represented by the block marked 47. This bias voltage generator can be of the type described in the copending application of Daniels, U.S. Ser. No. 417,715, filed Sept. 9, 1982. This application is assigned to the assignee of the present application. Other suitable bias voltage generators would be known to those skilled in the x-ray art. The same signal that switches the autotransformers can be used to switch the bias voltage generator from a condition where it lets 0 bias voltage exist on control grid 17 relative to the cathode of the x-ray tube to another condition where it applies a relatively high negative bias voltage on the grid. Thus, it switches in synchronism with the autotransformers in the x-ray tube power supply 35. Various bias voltage generators are known to those skilled in the x-ray art and can be designed by such persons. It is simply a device for rapidly switching the grid 17 from a 0 bias voltage state to a high negative bias voltage state. Although the components of the bias voltage generator are not shown, if the generator described in application Ser. No. 417,715 is used, it will comprise a step-up transformer with a rectifier in a secondary circuit for providing the high dc bias voltage between control grid 17 and filament 12 of the x-ray tube in the manner in which it is connected in FIG. 1. The primary of the bias voltage transformer is supplied from the output of a dc to ac inverter. The low and high logic signals provided over line 48 in FIG. 1 switch the inverter on and off alternately to produce the high negative bias voltage and 0 bias voltage conditions needed for the respective high and low energy exposures.

The x-ray tube filament current supply is symbolized by the block marked 49. The filament current supply can be one of the known types that contains a high voltage insulating or isolating transformer whose secondary terminals supply voltage to the x-ray tube filament 12 as by way of lines 50 in FIG. 1. The voltage applied to the primary winding of the filament transformer may be derived from a variable voltage ac source that can be controlled by a servosystem to feed a range of voltages to the primary winding. In the FIG. 1 embodiment, the signals for effectuating an adjustment of the filament voltage and, hence, filament emissivity and x-ray tube MA, is supplied by way of a line 51 which is output from a DAC 52 whose digital input signals that establish the filament current level are supplied by way of a digital bus 53 which is output from a system controller CPU 43. The current and other exposure factors and other control functions are chosen by the operator using the keyboard on an operator interface unit which is represented by the block marked 54. A bidirectional bus 55 connects the operator interface unit 54 with the system controller CPU 43. The CPU of course stores the operating system and programs that bring about execution of the x-ray exposures for each digital subtraction angiography procedure.

Digital video processor (DVP) 30 in FIG. 1 communicates with CPU 43 by way of a bidirectional digital bus 60. The DVP may be of the type described in Andrews, et al., Ser. No. 321,307, filed Nov. 13, 1981, now U.S. Pat. No. 4,449,195, which is owned by the assignee of this application. CPU 43 sends digital data instructions in the form of a recipe to DVP 30 under program control. Images that are output from DVP 30 can be displayed on a TV monitor 61 or data representing the images may be stored in an image storage medium 62 such as a magnetic disk recorder.

Another system component in FIG. 1 which has not been mentioned as yet is a look-up table (LUT), represented by the block marked 63. A bus 64 places LUT 63 and the system controller 43 in communication. The purpose of LUT 63 will be discussed in detail later.

Another component not yet mentioned in FIG. 1 is an automatic exposure control sensor, represented by the block labeled AEC sensor and marked 65. Basically, the AEC sensor determines the total amount of light emitted by the output phosphor 25 of the x-ray image intensifier 24 during low and high energy x-ray exposures and produces a corresponding output signal. A suitable sensor is described in the previously cited Grajewski copending application Ser. No. 550,825. The AEC sensor derives a signal, corresponding to image intensifier brightness during an x-ray exposure, from a photosensitive detector 66 such as a photodiode 66. The signal is obtained over a line 67 out of the photosensitive detector. Although the components of the sensor are not shown, it is sufficient to be aware that the signal corresponding to image intensifier brightness is supplied to an integrator, not shown, in the AEC sensor 65. The integrator produces a ramp signal whose magnitude depends on the duration and intensity of the exposure. The user determines the integrated brightness, corresponding to x-ray dose, that is desired for the low energy mask image exposure by entering the request by way of operator interface 54. This information is used by the system controller 46 to provide signals by way of a bus 68 to the AEC sensor 65 corresponding to the desired x-ray dose and the exposure is terminated when the desired dose is reached. The measured time value is sent back to the system controller CPU 43, such as less than one or more than one TV frame time, which it took to accumulate the desired dose for the low energy mask image exposure that is sent to the CPU is stored and used subsequently to govern the time of all low energy exposures in a sequence of dual energy exposure pairs.

After an initial low energy mask image is made and its exposure time is determined, a similar high energy mask image is made and its exposure time is measured and stored. It is known to use automatic exposure control for determining the duration of each of low and high energy exposures in a sequence. According to prior practice, however, the same exposure time was used for both high and low ehergy exposures. But the problem with prior practice is that if one tries to use the same time for the low and high energy exposures, sometimes too much light is provided to the TV camera while at other times not enough light is provided. Thus, the user would have to make several trial exposures and would be required to adjust the exposure time until the desired light level to the TV camera was obtained. In accordance with the invention, the proper exposure times are separately determined for the high and low energy exposures and the time for each is stored. Thus, after the low and high energy mask images are made and stored the AEC sensor 65 is disabled and the stored low and high energy mask image exposure times are used to control the durations of all low and high energy exposures in the ensuing sequence or run of pre-contrast dual energy exposures. An advantage of this procedure is that the radiation doses, corresponding to integrated image intensifier brightness, for the low and high energy exposures will be constant and substantially equal throughout the entire sequence.

After the mask exposure sequence is performed, a run exposure sequence is continued during which a large number, typically up to a maximum fifty dual energy exposure pairs are made through the pre-contrast interval when no x-ray contrast medium has reached the blood vessel of interest and continuing through the post-contrast interval when the contrast medium enters, rises to a maximum and leaves the vessel of interest.

Figure 2:
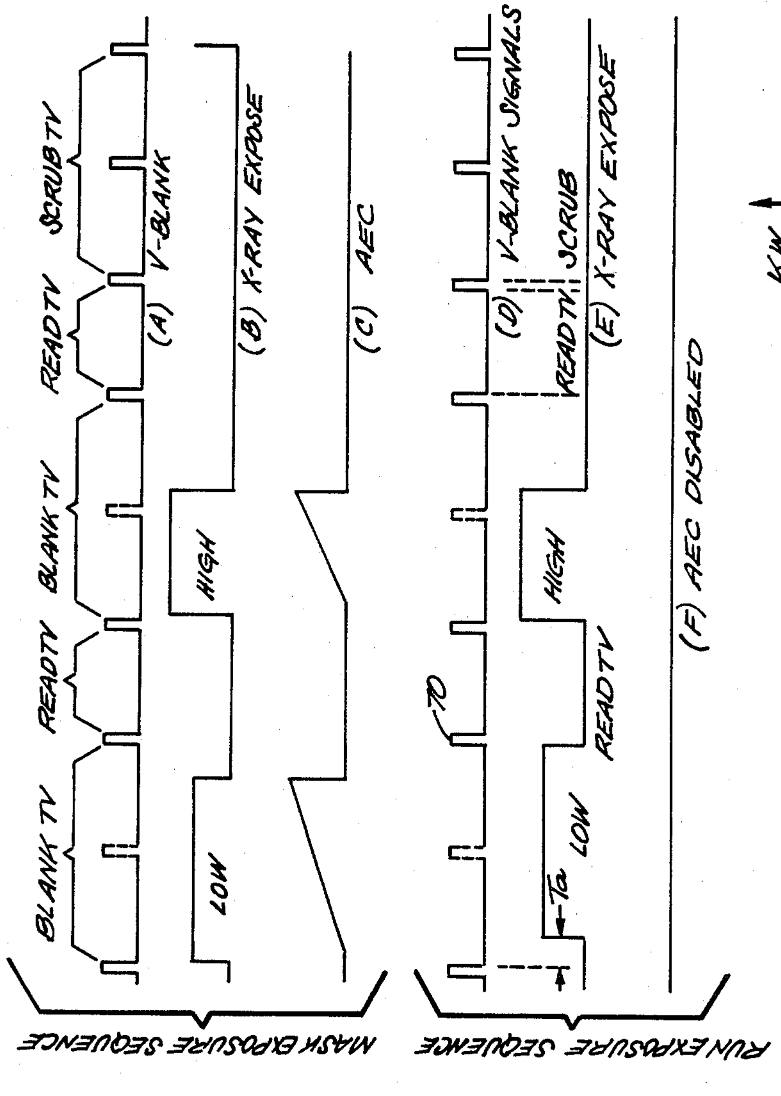
FIG. 2 is a timing diagram that is useful for describing operation of the system.

The timing diagrams for the mask and run sequences are depicted in FIG. 2. Line A in FIG. 2 shows the vertical blanking pulses for the TV camera pickup tube. As is known, the vertical blanking pulses repeat approximately every 33 milliseconds in a 60 Hz television camera. As shown in line B, the low energy mask exposure is initiated immediately after the end of a vertical blanking pulse which is indicated by solid lines. When the system is initialized for making the low energy mask image, the system controller 43 sends a signal to the filter shifter 22 which causes the low energy filter 20, for example, to be inserted in the x-ray beam path. In the particular FIG. 2 example, it will be evident that the low energy x-ray mask image exposure was terminated by AEC after about one and one-half television frame times had elapsed as is evident in line B. The target of the TV camera pickup tube is not read out and is blanked during all low and high energy x-ray exposures. If readout were to occur during an x-ray exposure, the upper region of the x-ray tube target could still be building up charge due to the image after the target readout electron beam of the TV camera has passed by this region. In any case, readout of the TV camera target is always done within one frame time between two vertical blanking pulses that immediately follow an exposure. During the one TV frame time allowed for target readout the filter shifter 22 is caused to insert filter 21 in the x-ray beam for the high energy mask exposure. As can be seen in line B of FIG. 2, a high energy exposure is initiated by the blanking pulse that terminates camera tube target readout. In the illustrated example, the high energy mask image exposure was terminated by AEC at a time slightly longer than a single TV frame time. After each high energy exposure is read out, then one may see in line B that the TV camera pickup tube target is scrubbed for at least one TV frame time but, generally, scrubbing is continuous through the frame immediately before the next low energy exposure is made. Scrubbing the TV camera target after the second of each exposure in dual energy pair of exposures is completed is carried out during the run sequence as well. As shown in line C, FIG. 2, the AEC control integrates intensifier brightness or x-ray dose up to a certain level for the low energy exposure and to the same level for the high energy exposure. Then, as explained earlier, the system controller CPU 43 calculates the exposure time of each of the low and high energy mask images and stores this information for use during the low and high energy exposure pairs run sequence that follows acquisition of the mask images.

It will be noted in line B of FIG. 2 that after the low energy exposure terminated nothing happened until the next TV vertical blanking pulse occurred which initiated TV target readout. It will be evident from this that the time elapsed between termination of the low energy exposure and the beginning of the ensuing high energy exposure is not minimized as yet. As explained earlier, a feature of the new method is to minimize the delay between termination of the low energy exposure and beginning of the high energy exposure during a sequence of dual energy image pairs that are obtained during the pre-contrast and post-contrast run or sequence that follows acquisition of the low and high energy mask images.

After the mask images are acquired, the programmed system controller 43 makes several calculations and issues several commands prior to continuing with the run sequence. One of the commands is to calculate the maximum number of images that can be allowed to occur on the basis of x-ray tube heat capacity and actual low and high kVp exposure times, and the controller limits the run sequence to the calculated maximum number of images.

The system controller also commands the x-ray power or generator 35 to use the measured low and high kVp mask exposure times for the run exposures, rather than using AEC to determine the exposure times. The fact that the AEC is disabled during the postmask or run sequence is manifested by line F in FIG. 2. In an actual embodiment, the system controller provides a command signal to the digital video processor 30 which sends the ultimate command signals to the exposure logic module 46. The calculated exposure times are supplied to exposure timer 39 so it will send out the signals for closing and opening the previously mentioned solid-state switch in the Y-connected primary of the step-up transformer in the x-ray power supply 35. There are two reasons for holding the mask exposure times. First, the low energy images acquired during the run sequence are ultimately subtracted, respectively, from the low energy mask image and the high energy images are ultimately subtracted, respectively, from the high energy mask image. The object is to highlight any density differences which occur in the patient as a result of the introduction of the x-ray contrast medium. If the AEC system were active during the run sequence instead of using the mask exposure times according to the invention, it would automatically compensate for such density changes, which would be undesirable. Secondly, by retaining the mask exposure times using them to control the durations of the low and high energy exposures independently, there is no longer any uncertainty when the low kVp exposure is going to end. The system controller uses the exactly determined time that the exposure ends to advantage in connection with performing the next calculation following acquisition of the mask images.

The next thing that the system controller's CPU 43 calculates after mask acquisition is an anticipation time, $T_a$. The calculated anticipation time is used to minimize the time lapse between the end of the low energy exposures and the start of the high energy exposures during the run sequence, thereby minimizing the probability of patient motion occurring between acquisition of successive low and high energy images. Motion between the low and high energy exposures can degrade hybrid image quality and any other images that depend on dual energy exposures.

Now refer to FIG. 2 again. The important point to be aware of in connection with these timing diagrams is that the TV camera must operate in synchrony with the ac power lines at 50 or 60 Hz. This is because the TV camera sensitivity is so great that it would generate undesirable "humbars" in the video images due to stray electromagnetic interference at line frequency if it were operated asynchronous with the ac power line. Because of this the low kVp or low energy exposure must be read from the TV camera target at a point in time which is governed by the ac power line frequency, not at the end of the low kVp x-ray exposure. Since, as shown in line A, the actual TV camera target readout time takes one TV frame time, the actual time between exposures can be as small as one TV frame time and almost as large as two TV frame times, depending upon when the low kVp exposure terminates in relation to the ac power line synchronization pulse, which is denoted as "V-Blank" in FIG. 2. Having the required low energy exposure time information, the system controller CPU 43 calculates the anticipation time, $T_a$, which is used to synchronize the onset of low energy or low kVp exposures with the ac power line such that the exposure terminates just before a V-Blank pulse, which allows immediate readout of the TV camera target, thereby minimizing the time lapse between the low and high energy exposure in accordance with the invention. In detail, $T_a$ is calculated as the difference between the low energy exposure time as determined by AEC and the time or the sum of the times of an integer number of frames through which the low energy exposure extended. Mathematically, this is expressed as:

$$T_a = \text{Min}[(N \times T_{fr}) - T_{low} > 0]$$

where:

$T_a$=Anticipation time.

Min[>0] denotes the minimum time greater than 0.

N=A positive integer.

$T_{fr}$=TV frame time.

$T_{low}$=Actual low kVp exposure time.

To use a numerical example, the low energy mask exposure time, $T_{low}$, as determined by AEC in line B of FIG. 2 is, say, 58 milliseconds (ms) and a frame time, $T_{fr}$, in a 60 Hz system is 33 ms. The exposure interval has extended over one full TV frame and part of the next one so the integer number of frame time is 2 or N=2. Thus $$T_a = [(2 \times 33\ ms) - 59\ \text{ms}]$$

$$T_a = 66 - 58 = ms$$

As one may see in line E of FIG. 2, $T_a$ is the delay time by which the low energy exposure must be shifted so that it terminates at the rise time of a vertical blanking pulse 70 whose fall time initiates readout of the TV camera tube target. As can be seen in line E, this minimizes the amount of time between the end of a low energy exposure in the run sequence and the beginning of a high energy exposure to never more than the single TV frame time which is used to read out the target during which time other conditions can be fulfilled such as inserting a different filter in the x-ray beam before the next high energy exposure is started. Thus, referring to line A of FIG. 2, the system controller CPU 43 commands beginning the low kVp mask exposure in synchrony with a V-Blank pulse. For the low kVp run exposures, on the other hand, the system controller 43 delays the exposure from the V-Blank pulse by the anticipation time, $T_a$, which makes the low kVp exposures terminate just before a V-Blank pulse and before TV camera target readout, which is desired. The system controller then brings about the low kVp exposure in a pair comprised of a low kVp and high kVp exposure by using the $T_a$ delay.

The system controller 43 recognizes the end of the low kVp x-ray exposure and commands the digital video processor (DVP) 30 to acquire and store the low energy image from the TV camera and commands the filter shifter to shift the appropriate filter into the beam for making a high kVp exposure, and commands the x-ray power supply to prepare for a high kVp exposure which involves applying the negative bias voltage to the grid 17 of the x-ray tube and selecting or closing the high kVp solid-state switch that connects the higher voltage autotransformer in the x-ray power supply to the free ends of the Y-connected primary of the step-up transformer. When the DVP 30 signals the system controller by way of bus 60 that the low kVp image has been acquired, the system controller CPU 43 verifies that the high kVp filter 21 is in place. If these conditions are met, the system controller commands the x-ray power supply to initiate the high kVp exposure. The high kVp exposure is terminated when the previously measured and stored high kVp mask exposure time is reached. These exposure times are supplied to the exposure logic module 46 which provides the data to exposure timer 36 for governing the length of each exposure which, in turn, is governed by the length of time that the primary solid-state switch in x-ray tube power supply 35 is conductive.

The system controller 43 recognizes the end of the high kVp x-ray exposure and commands the DVP 30 to acquire and store the high kVp image from the TV camera, commands the beam filter shifter to move into position for a low kVp exposure, and commands the x-ray tube power supply to prepare for a low kVp exposure, which involves removing the negative bias voltage from the x-ray tube control grid and connecting the open ends of the primary winding of the step-up transformer to the autotransformer that has been adjusted for causing the higher kVp to be applied to the x-ray tube anode. The foregoing run sequence of initiating low energy exposures by a time, $T_a$, after a vertical blanking pulse, terminating at the beginning of a vertical blanking pulse that initiates TV camera readout, making the high energy exposure after readout which is usually shorter than the low energy exposure, effecting readout of the TV camera tube for the high energy exposure during the first full frame time following termination of the high energy exposure and then scrubbing the TV camera target for at least one frame is repeated as many times as is required to acquire the desired number of low and high energy images. It may be noted, it turns out that the high energy exposures as determined by AEC are usually about 60 to 80% of the low energy exposure time.

As indicated earlier, another feature of the invention is the manner in which the x-ray tube is protected against thermal overload and consequent damage. Recall that the x-ray tube target may be damaged if its bulk or whole mass is allowed to rise above a certain temperature such as 1100° C. or if the focal spot exceeds a certain temperature such as about 3000° C. at which melting of the target in the focal track may occur. The temperature of the bulk of the x-ray tube target will always rise with exposures. As indicated earlier in reference to the focal spot configuration 19 in FIG. 4, biasing the x-ray tube grid during the high energy or high kVp exposures concentrates or focuses the electron beam energy more sharply than during the unbiased exposures at the low energy or low kVp. The smaller focal spot and, hence, more concentrated energy has a greater propensity to melt the target in its focal track. It is also necessary to take into consideration the possible increase in the temperature of the bulk of the x-ray tube target 15 which it may undergo during a dual energy sequence. If the total energy of the exposure pairs is relatively low, the temperature of the bulk of the target will remain within tolerance. If the target is relatively cold at the start of an exposure sequence, more energy can be put into it and there will be less likelihood of focal spot melting and excessive temperature of the bulk of the target. As a practical matter, the user must be allowed to choose a low kVp and MA combination that is appropriate for the x-ray technique that is to be executed. It is conceivable that the amount of electric power in terms of kilowatts (KW) imparted to the target will be exceeded with the selected low kVp and MA combination if the related high kVp and MA combination results in excessive total energy input to the target after a certain number of dual energy exposures have been made. The KW or power input to the x-ray tube target is the product of kVp and MA. In digital subtraction fluorography the low kVp is typically in the range of 60 to 90 kVp and the tube current range is typically about 200 to 1250 MA. The high kVp is fixed and, by way of example, is typically around 130 to 140 kVp. The high energy exposure x-ray tute MA is a variable that has to be selected to avoid target melting and excessive bulk temperature, and this depends on what low kVp and low MA is selected. In accordance with the invention, a new approach is to choose the high energy MA so that the product of high kVp and the designated high MA will not raise the temperature of the focal track of the target any more than does the low kVp and MA combination.

Figure 3:
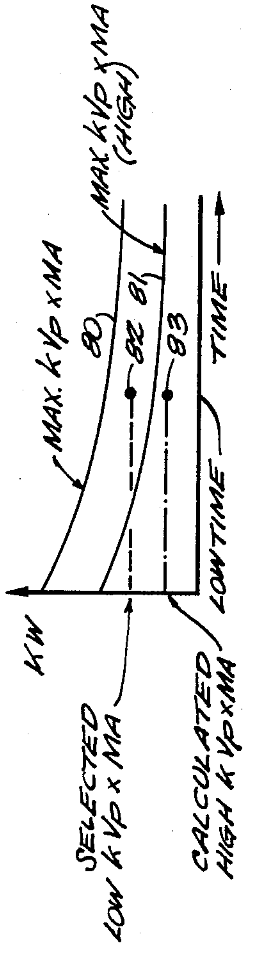
FIG. 3 is a graph that is useful for describing how the x-ray tube is protected against thermal overload.

FIG. 3 is a plot of the power in terms of kilowatts (KW) that a particular illustrative x-ray tube used in a digital subtraction angiography procedure can withstand for any given period of time. The uppermost curve 80 is the maximum power or maximum kVp and MA product that the tube target can withstand. A particular x-ray tube operated at a maximum high kVp such as 130 to 150 kVp also has limits on the MA that can be used in relation to total exposure time. Curve 81 in FIG. 3 is a plot of the withstand KW of the particular tube target obtained by fixing the high kVp at about 130 kVp and making exposures at different MA values for given lengths of time. In other words, curve 81 is an expression of how the tube must be derated as MA and time increase when the high kVp is used. In a particular tube, by way of example and not limitation, it was found that the KW rating of the tube when the high kVp was applied and the grid was biased was about or a little more than 60% of the rating of the tube when it was operated in its unbiased mode. So, in accordance with the invention, grid bias voltages are chosen to get a high energy or high kVp and MA combination which results in the high energy KW never exceeding the low energy percentage of the low energy maximum permissible power for any exposure time. By way of example, in FIG. 3 assume that a low kVp and MA combination for an exposure sequence that is to be conducted over a known time interval is indicated by the point marked 82 in FIG. 3. This power is about 80% of the power level of curve 80 in FIG. 3 at the same time. Now since high kVp is fixed at some value such as 130 kVp, 80% of the maximum permissible power or KW at high kVp is taken and the high MA can be calculated. The calculation assumes that the exposure times for the high energy exposures will be the same as for the low energy exposures. This is the worst case since, in fact, the high energy exposures would usually be shorter than the low energy exposures where the x-ray dosages for the lows and highs could be about the same for subtraction angiography.

The MAs for the high kVp or high energy exposures are chosen according to the following rules:

$$1.\ \text{high MA} = \frac{\text{low MA} \times \text{low kVp}}{\text{high kVp}}$$

(Provided that the bulk x-ray tube target temperature limit is reached before the target focal track temperature limit is reached.)

2. If the conditions specified in "1" are not met then:

$$\text{high MA} = \frac{\text{low MA} \times \text{low kVp}}{\text{high kVp}} \times \frac{\text{max high KW}}{\text{max low KW}}$$

The additional term max high KW÷max low KW accounts for the difference in power of KW handling capability between the low kVp, with the x-ray tube unbiased and the large focal spot, and the high kVp where the x-ray tube grid is negatively biased and a concentrated focal spot results. This term must be added because, generally, when the tube is biased as previously explained, the projected size of the focal spot on the x-ray tube target shrinks, thereby concentrating the power delivered into a small area and giving rise to a higher focal track temperature so as to increase the risk of melting the track.

In any case, the high MA is calculated to keep the power or KW for the low and high energy exposures substantially equal.

In FIG. 3, the calculated KW and, hence, the high MA for the case where the selected low kVp and MA product is at point 82, about 60% of the latter puts the calculated high kVp power or KW at the point marked 83.

In accordance with the invention, the MA values for the high energy exposures can be calculated and arranged in a table in relation to user selected kVp and MA values for the low energy exposures. The data resulting from these calculations need not be generated in real time right after low energy tube factors are selected which would put additional load on the system controller CPU 43. Instead, in accordance with the invention, these data are calculated for the x-ray tube that will be used in the apparatus and stored in a lookup table. Lookup table (LUT) is represented by the block marked 63 in FIG. 1. The values corresponding to the calculated values are stored in digital form at addressable locations in LUT 63. A table resulting in establishing the high energy MA values as a function of the user selected low energy MA and kVp values may take the following form by way of example and not limitation:

| User Selected Low MA | User Selected Low kVp 60-70 | 71-80 | 81-90 |
|---|---|---|---|
| | Calculated High MA | | |
| 200 | 100 | 125 | 160 |
| 250 | 100 | 125 | 160 |
| 320 | 125 | 160 | 200 |
| 400 | 160 | 200 | 250 |
| 500 | 200 | 250 | 320 |
| 640 | 250 | 320 | 400 |
| 800 | 320 | 400 | 500 |
| 1000 | 400 | 500 | 500 |
| 1250 | 400 | 500 | 500 |

Thus, if the user selects an MA value for the low energy exposures and a low kVp value in the three low kVp ranges of 60–70, 71–80, and 81–90 kVp, the CPU interprets these parameters as addresses to locations in LUT 63 at which the corresponding or previously calculated high MA that ought to be used are located. The MA value in digital form that was accessed from LUT 63 by system controller CPU 43 is the high energy exposure MA and the CPU provides the signals to the DVP 30 which governs exposure logic 46 cause the proper bias voltage to be applied to the grid of the x-ray tube for the high energy exposures as explained hereinbefore and in the previously cited copending application of J. Grajewski.

We claim:

1. A subtraction angiography method that uses a television (TV) camera to form images on its target corresponding to x-ray images and which camera produces vertical blanking pulses at constant periodicity to mark the beginning and end of TV frame times, said method including the steps of providing for:

exposing an anatomical region to a low average energy x-ray beam from an x-ray tube for an interval beginning with occurrence of a vertical blanking pulse and ending within a frame time and extending over less or more than one frame time while a relatively low peak kilovoltage (kVp) is applied to the anode of the tube and a predetermined current (MA) is flowing through the tube to thereby form a nominally low energy mask image on the target in the TV camera;

terminating said exposure with automatic exposure control (AEC) in response to a predetermined x-ray dose having been administered and then determining and storing the exposure time for the low energy mask image;

after the exposure is terminated, reading out the TV camera target and storing the low energy mask image;

exposing said region to a higher average energy x-ray beam for an interval beginning with occurrence of a vertical blanking pulse and ending within a frame time and extending over less or more than one frame time after the low energy exposure while higher kVp is applied to said anode and a predetermined MA is flowing through said tube to thereby form a nominally high energy mask image on the target in the TV camera;

terminating said high energy exposure with AEC in response to a predetermined x-ray dose having been administered and then determining and storing the exposure time for the high energy mask image;

after the high energy exposure is terminated reading out the TV camera target and storing the resulting high energy mask image;

then in order to make a subsequent sequence of alternating low and high energy exposures wherein the exposures at one energy are terminated coincident with a blanking pulse that initiates the first available frame time for readout of said camera target and the exposures at the other energy are started coincident with the blanking pulse at the end of said readout frame, determining the time ($T_a$) that elapsed between termination of the mask image exposure at said one energy and the next ensuing vertical blanking pulse demarking the end of the frame time in which said exposure terminated;

initiating each of said subsequent exposures at said one energy after a delay of $T_a$ following occurrence of a vertical blanking pulse demarking the beginning of a frame time such that said exposures terminate coincident with a vertical blanking pulse ending a frame time;

reading out the TV camera target during the interval between said last named blanking pulse and a following vertical blanking pulse;

initiating said exposures at said other energy immediately after occurrence of said following blanking pulse and terminating the exposure at the same time that the corresponding mask image was terminated with AEC; and reading out the TV camera target beginning with the first blanking pulse following the frame in which the exposures at said other energy terminated.

2. The method according to claim 1 including the step of scrubbing the target of the TV camera through the frames between readout of the image on said target resulting from exposure at said other energy and up to the frame during which exposure at said one energy begins.

3. A method of preventing the anode target of a rotating anode x-ray tube from attaining damaging temperatues in the bulk of the target, at its focal spot and along its focal track when the tube is used for making a sequence of alternating closely successive low x-ray energy and high x-ray energy exposures, where the low energy exposures are made with a selected relatively low peak kilovoltage (kVp) applied to the target of the x-ray tube and with a selected relatively high milliamperage current (MA) flowing through the tube and the high energy exposures are made with a fixed, relatively higher kVp on the target and with relatively lower MA, said lower MA being determined by the level of the negative bias voltage applied to the grid of the x-ray tube during high energy exposures, said method comprising:

determining a first plot of decreasing maximum permissible kilovoltage (KW) or MA and low kVp product the tube target can withstand without melting at its focal spot versus increasing x-ray exposure times when said grid is unbiased so the focal spot is at its largest size;

determining for said tube a second plot of decreasing permissible KW the tube target can withstand without melting at its focal spot while said high kVp is applied to said target versus increasing exposure times where the grid has been increasingly negatively biased to produce the MA values that result in the corresponding KW values and where the power in the focal spot becomes more concentrated on said target with increasing bias voltage;

before making the sequence of exposures select the kVp and MA and exposure time desired for the low energy exposures and using the result of calculating MA and kVp product or first KW to determine what percentage this KW is of the maximum permissible KW according to said first plot where the x-ray tube grid is unbiased;

taking the same percentage of KW according to the second plot for the high kVp on the target to determine the KW allowed for the high energy exposure for the corresponding exposure time at said fixed high kVp and calculate the MA that should be used for the high energy exposures, when said x-ray tube grid is negatively biased; and when making said low and high energy exposures apply the negative bias voltage level to said x-ray tube grid during the high energy exposures that will result in said last mentioned calculated MA flowing through said tube while said high kVp is on the x-ray tube target.

4. The method according to claim 3 wherein:

(high) refers to high energy exposures, (low) refers to low energy exposures, (high MA) is the tube current during high energy exposures when high kVp is on the x-ray tube target, (low MA) is the tube current during low energy exposures when high kVp is on the x-ray tube target, (max KW) is the predetermined maximum kilowattage (KW) or MA and kVp product that is permissible to supply to the tube target at a particular exposure time when the x-ray tube grid is unbiased, the focal spot is at its largest size and the fixed high kVp is on the tube target, (max high KW) is the maximum KW that is permissible to supply to the tube target when there is a negative bias voltage on the control grid, and said permissible high MA for a high energy exposure at said fixed kVp corresponding to the selected MA and kVp is determined as follows:

$$1.\ \text{high MA} = \frac{\text{low MA} \times \text{low kVp}}{\text{high kVp}}$$

provided that the tube target bulk temperature limit will be reached before the target focal track temperature limit will be reached 2. If the conditions in case "1" are not met then:

$$\text{high MA} = \frac{\text{low MA} \times \text{low kVp}}{\text{high kVp}} \times \frac{\text{max high KW}}{\text{max low KW}}$$

* * * * *